United States Patent
Basavapatna et al.

(10) Patent No.: US 9,112,896 B2
(45) Date of Patent: *Aug. 18, 2015

(54) MOBILE RISK ASSESSMENT

(71) Applicant: McAfee, Inc., Santa Clara, CA (US)

(72) Inventors: Prasanna Ganapathi Basavapatna, Bangalore (IN); Satish Kumar Gaddala, Bangalore (IN); Sven Schrecker, San Marcos, CA (US); David Moshe Goldschlag, Silver Spring, MD (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/199,274

(22) Filed: Mar. 6, 2014

(65) Prior Publication Data
US 2014/0250533 A1 Sep. 4, 2014

Related U.S. Application Data

(63) Continuation of application No. 13/339,221, filed on Dec. 28, 2011, now Pat. No. 8,677,497.

(60) Provisional application No. 61/548,194, filed on Oct. 17, 2011, provisional application No. 61/548,224, filed on Oct. 18, 2011.

(51) Int. Cl.
*G06F 21/00* (2013.01)
*H04L 29/06* (2006.01)
(Continued)

(52) U.S. Cl.
CPC .......... *H04L 63/1433* (2013.01); *G06F 21/577* (2013.01); *H04W 4/02* (2013.01); *H04W 12/12* (2013.01); *H04L 63/0272* (2013.01)

(58) Field of Classification Search
CPC ..................................................... G06F 21/00
USPC ............................................ 726/25; 455/410
See application file for complete search history.

(56) References Cited

U.S. PATENT DOCUMENTS 5,987,610 A 11/1999 Franczek et al.
6,073,142 A 6/2000 Geiger et al.
(Continued)

FOREIGN PATENT DOCUMENTS

WO WO 2013/059210 4/2013
WO WO 2013/059217 4/2013

OTHER PUBLICATIONS

Information Technology Risk Management, Copyright 2002, © Glen B. Alleman, Niwor, Colorado, 22 pages.
(Continued)

*Primary Examiner* — William Powers
(74) *Attorney, Agent, or Firm* — Patent Capital Group

(57) ABSTRACT

A query is received from a particular endpoint device identifying a particular wireless access point encountered by the particular endpoint device. Pre-existing risk assessment data is identified for the identified particular wireless access point and query result data is sent to the particular endpoint device characterizing pre-assessed risk associated with the particular wireless access point. In some instances, the query result data is generated based on the pre-existing risk assessment data. In some instances, pre-existing risk assessment data can be the result of an earlier risk assessment carried-out at least in part by an endpoint device interfacing with and testing the particular wireless access point.

25 Claims, 10 Drawing Sheets

(51) Int. Cl.
*G06F 21/57* (2013.01)
*H04W 4/02* (2009.01)
*H04W 12/12* (2009.01)

(56) References Cited

U.S. PATENT DOCUMENTS

| | | | |
|---|---|---|---|
| 6,108,644 | A | 8/2000 | Goldschlag et al. |
| 6,266,704 | B1 | 7/2001 | Reed et al. |
| 6,460,050 | B1 | 10/2002 | Pace et al. |
| 6,738,905 | B1 | 5/2004 | Kravitz et al. |
| 7,162,642 | B2 | 1/2007 | Schumann et al. |
| 7,181,530 | B1 | 2/2007 | Halasz et al. |
| 7,277,544 | B1 | 10/2007 | Eye et al. |
| 7,317,914 | B2 | 1/2008 | Adya et al. |
| 7,506,155 | B1 | 3/2009 | Stewart et al. |
| 7,546,276 | B2 * | 6/2009 | Randle et al. ............ 705/65 |
| 7,698,570 | B2 | 4/2010 | Schumann et al. |
| 8,249,886 | B2 * | 8/2012 | Meyer et al. ............ 705/1.1 |
| 8,677,497 | B2 | 3/2014 | Basavapatna |
| 8,949,993 | B2 | 2/2015 | Basavapatna et al. |
| 2002/0021805 | A1 | 2/2002 | Schumann et al. |
| 2002/0067914 | A1 | 6/2002 | Schumann et al. |
| 2002/0112186 | A1 | 8/2002 | Ford et al. |
| 2003/0219008 | A1 * | 11/2003 | Hrastar ............ 370/352 |
| 2004/0107219 | A1 * | 6/2004 | Rosenberger ............ 707/104.1 |
| 2006/0036480 | A1 | 2/2006 | Goldschlag et al. |
| 2006/0136332 | A1 * | 6/2006 | Ziegler ............ 705/39 |
| 2007/0186103 | A1 * | 8/2007 | Randle et al. ............ 713/168 |
| 2007/0286421 | A1 | 12/2007 | Schumann et al. |
| 2008/0137593 | A1 | 6/2008 | Laudermilch et al. |
| 2009/0060181 | A1 | 3/2009 | Eye et al. |
| 2009/0281856 | A1 * | 11/2009 | Meyer et al. ............ 705/7 |
| 2010/0112983 | A1 | 5/2010 | Walker et al. |
| 2010/0115581 | A1 | 5/2010 | Goldschlag et al. |
| 2010/0115582 | A1 | 5/2010 | Sapp et al. |
| 2011/0161232 | A1 | 6/2011 | Brown |
| 2011/0167470 | A1 | 7/2011 | Walker et al. |
| 2011/0276683 | A1 | 11/2011 | Goldschlag et al. |
| 2013/0097710 | A1 | 4/2013 | Basavapatna et al. |
| 2013/0097711 | A1 | 4/2013 | Basavapatna et al. |
| 2013/0198838 | A1 | 8/2013 | Schmidt et al. |

OTHER PUBLICATIONS

International Search Report and Written Opinion mailed Mar. 26, 2013 for International Application No. PCT/US2012/060455.

S.V. Athawale, et al. Detection of Rouge Access Point in 802. 11G Using MA. International Journal of Computer Science and Communication, vol. 2, No. 1, Jan.-Jun. 2011 (3 pages).

S. B. Vanjal, et al., "Detecting & Eliminating Rogue Access Point in IEEE 802.1 1 LAN." Feb. 19-20, 2010 (5 pages).

"McAfee Compatible Solution: AirPatrol WPM 1.0 and McAfee ePO 4.0." MacAfee homepage. Dec. 17, 2010 (2-pages).

Qing Ding, et al., "Reputation Based Access Point Selection in 802. 11 Network." Third 2008 International Conference on Convergence and Hybrid Information I Information Technology. 2008 (6 pages).

International Search Report & Written Opinion mailed Mar. 26, 2013 for International Application No. PCT/US2012/060466.

Novell ZENworks Endpoint Security Management, retrieved from the Internet <URL:https://secure-www.novell.com/docrep/2008/03/4641033PRINT_en.pdf>, Jan. 31, 2008 (28 pages.

Easy Guide to Understanding Endpoint Security Risks, Senforce Technologies, Inc., White Paper, May 2007, retrieved from the Internet <URL:http:www.pcsltd.com/pdf/012007-SecurityRisks.pdf> (7 pages).

Cisco NAC Layer 3 OOB with ACLs, retrieved from the Internet <http://www.cisco.com/image/gif/paws/112168/nac-cob-acls-00.pdf>, Nov. 2011 (34 pages).

USPTO Jul. 11, 2013 Nonfinal Office Action from U.S. Appl. No. 13/339,221.

USPTO Oct. 28, 2013 Notice of Allowance from U.S. Appl. No. 13/339,221.

USPTO Jan. 6, 2014 Nonfinal Office Action from U.S. Appl. No. 13/339,194.

International Preliminary Report on Patentability in international Application No. PCT/US2012/060466, mailed Apr. 22, 2014, 7 pages.

International Preliminary Report on Patentability in for International Application No. PCT/US2012/060455, mailed Apr. 22, 2014, 6 pages.

USPTO Jun. 16, 2014 Final Rejection from U.S. Appl. No. 13/339,194, 14 pages.

USPTO Sep. 26, 2014 Notice of Allowance from U.S. Appl. No. 13/339,194, 7 pages.

Extended European Search Report in Application No. 12842308.4-1853/2769571, PCT/US2012060466, mailed on Feb. 13, 2015, 7 pages.

Extended European Search Report in Application No. 12841657.5-1853/2769570, PCT/US2012060455, mailed on Feb. 13, 2015, 14 pages.

* cited by examiner

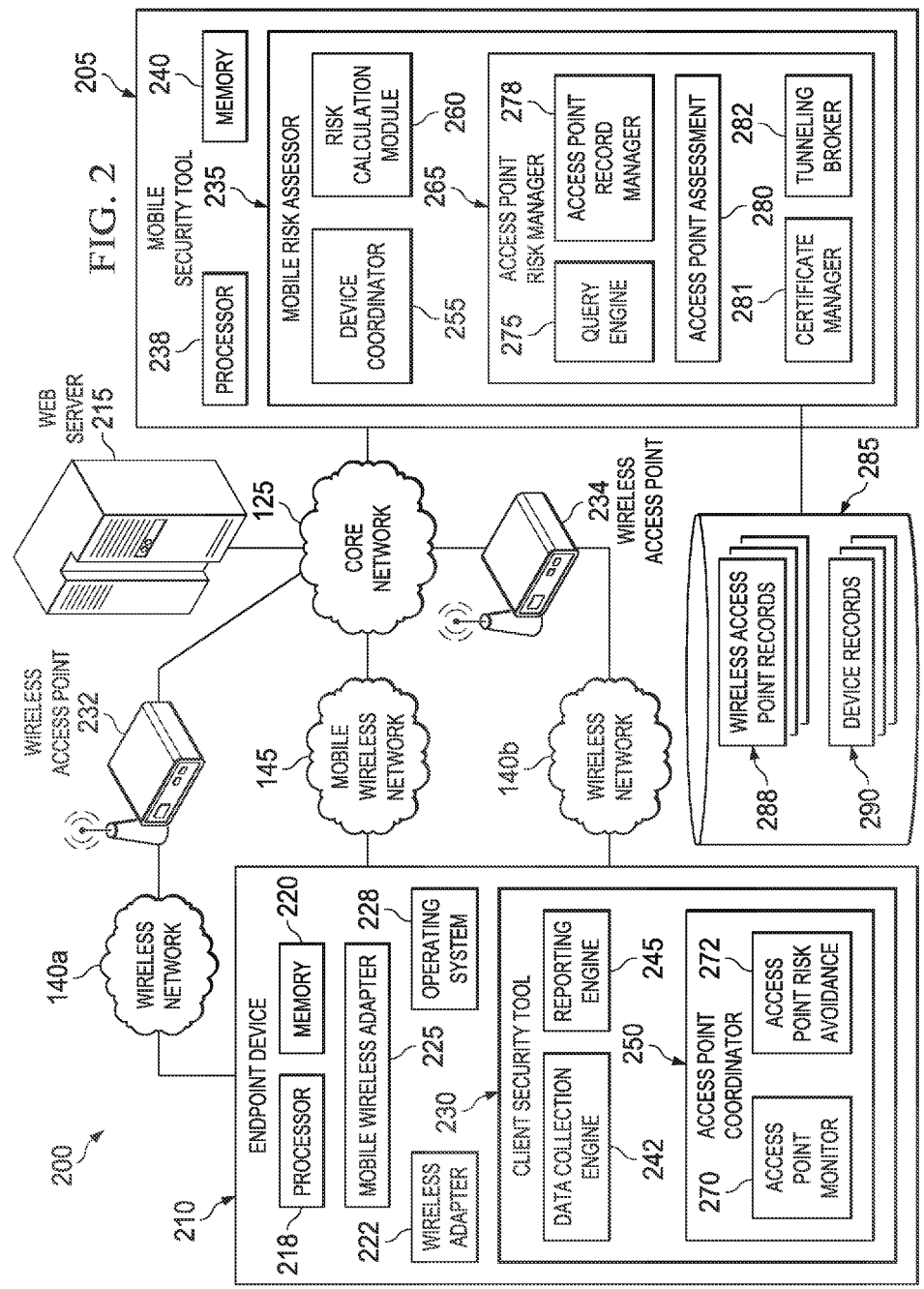

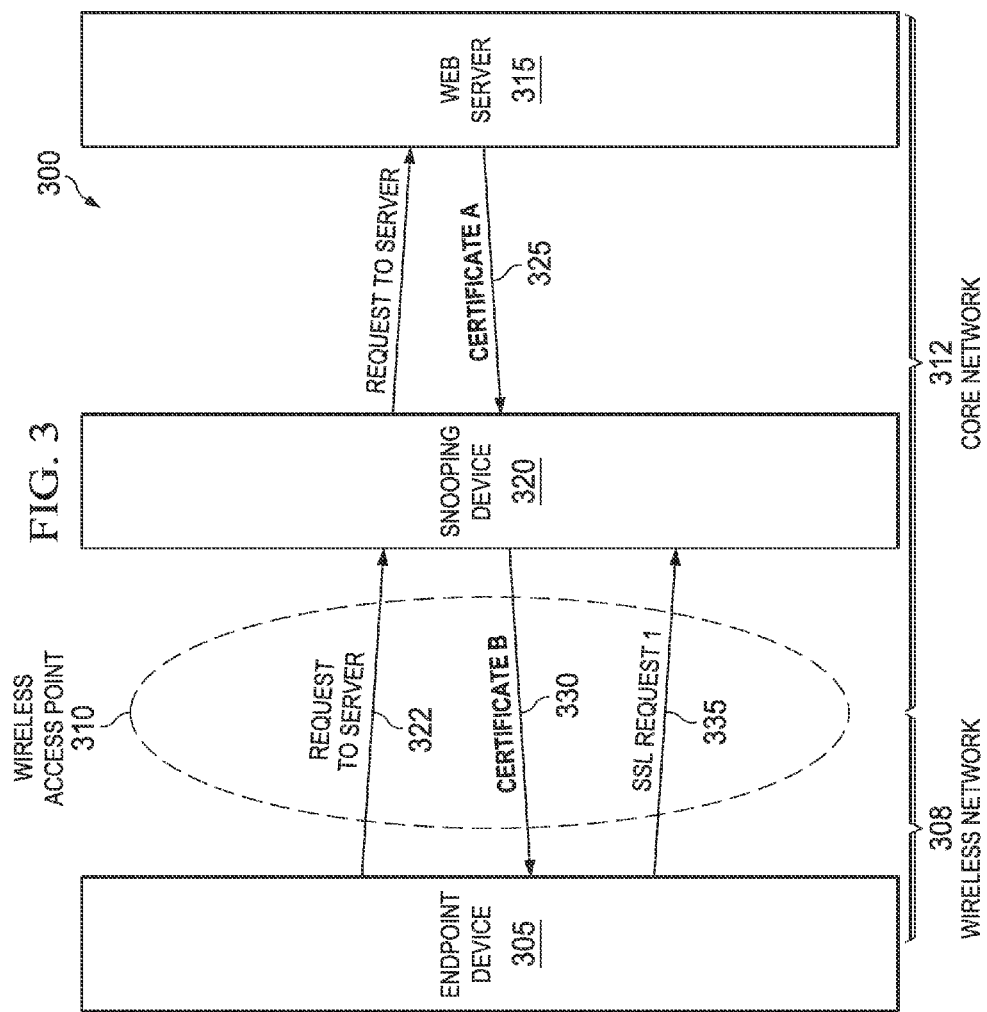

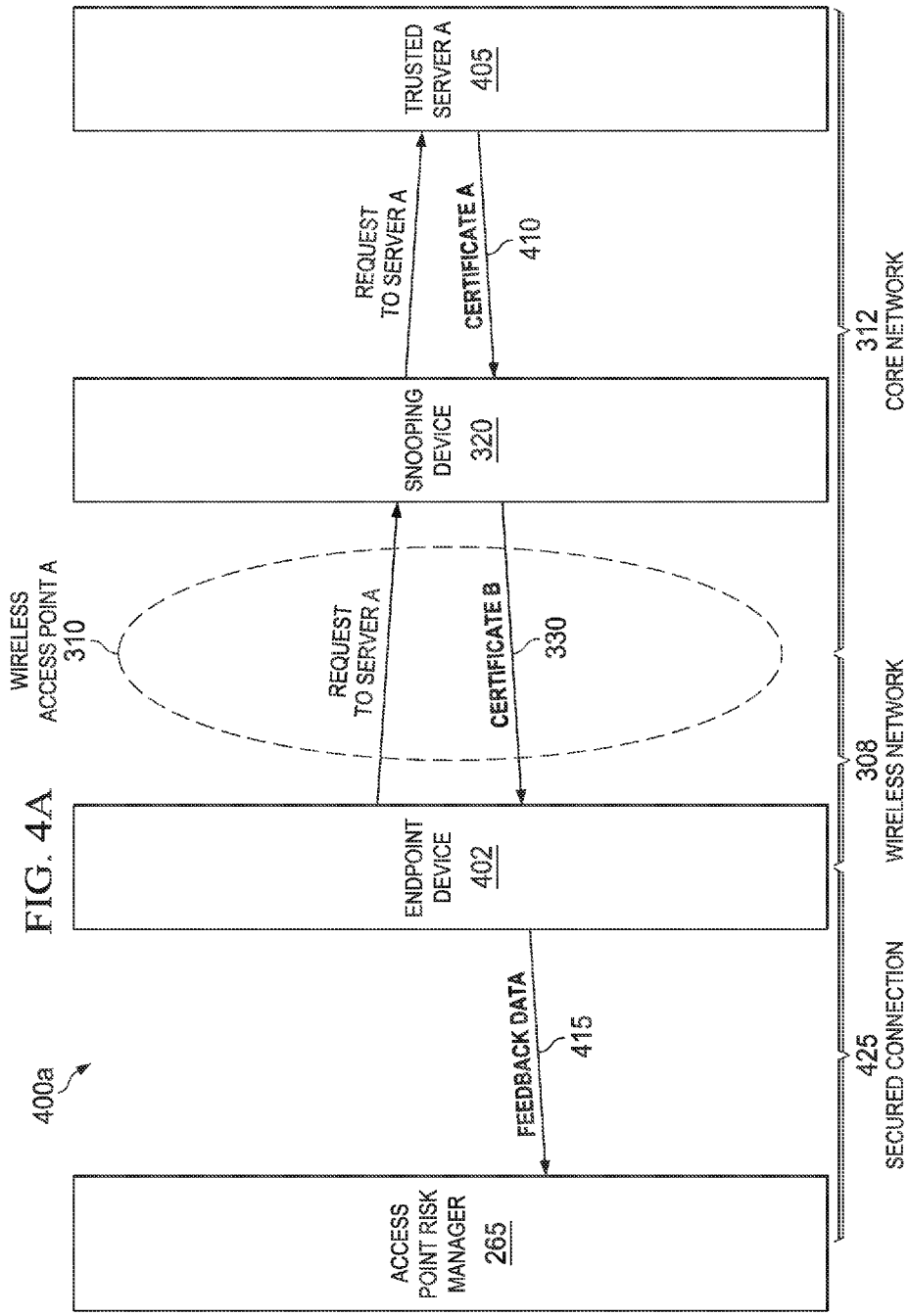

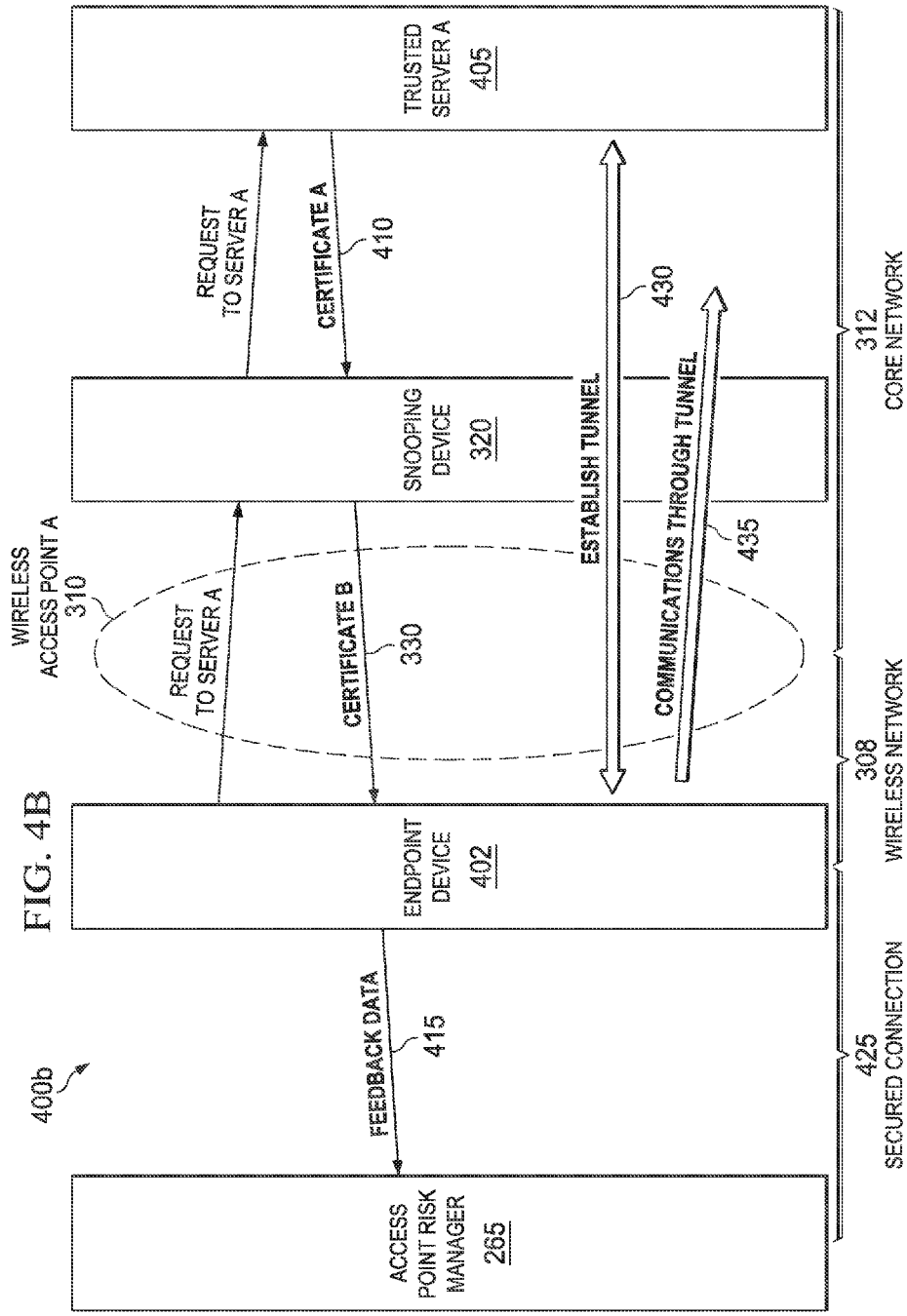

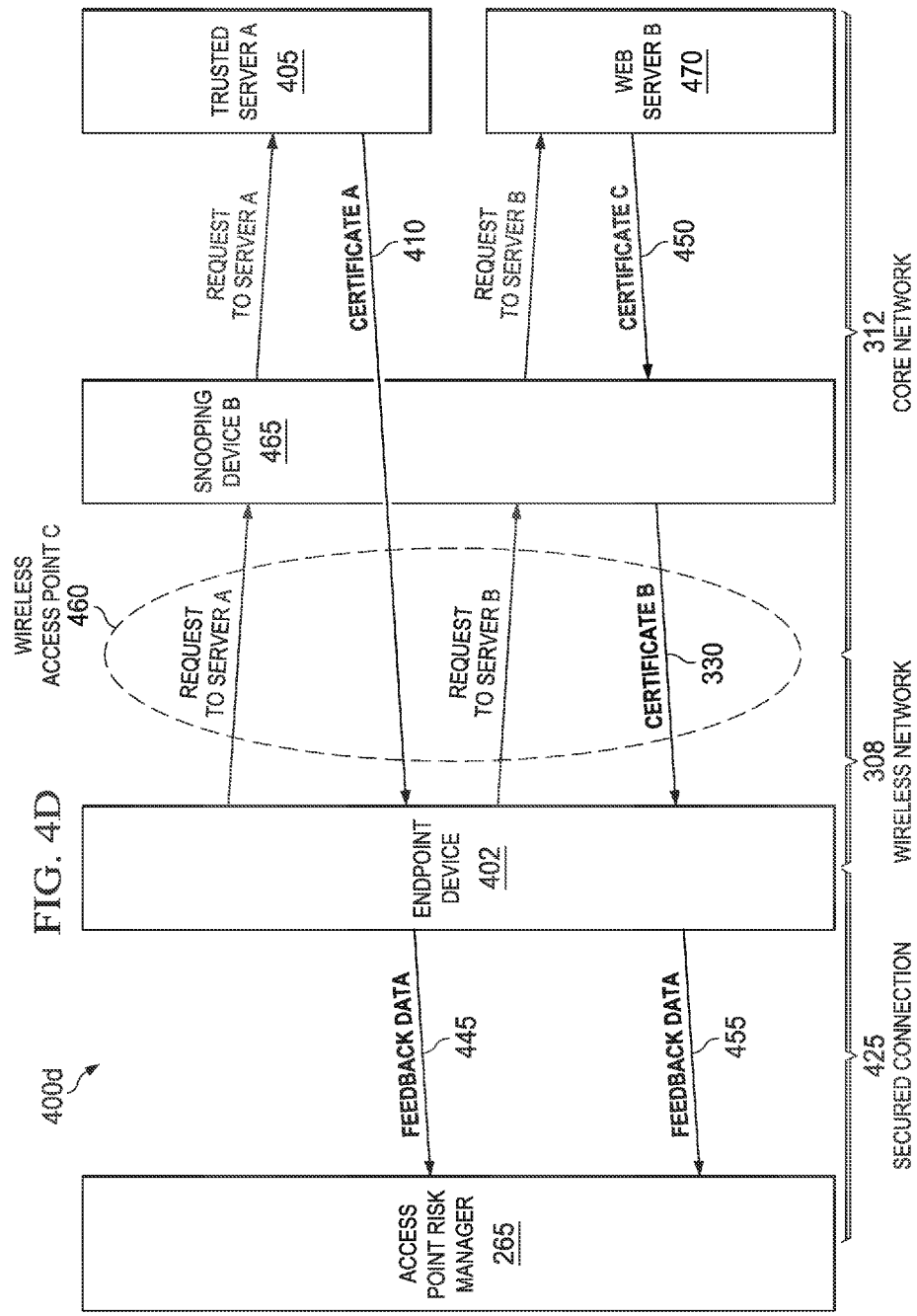

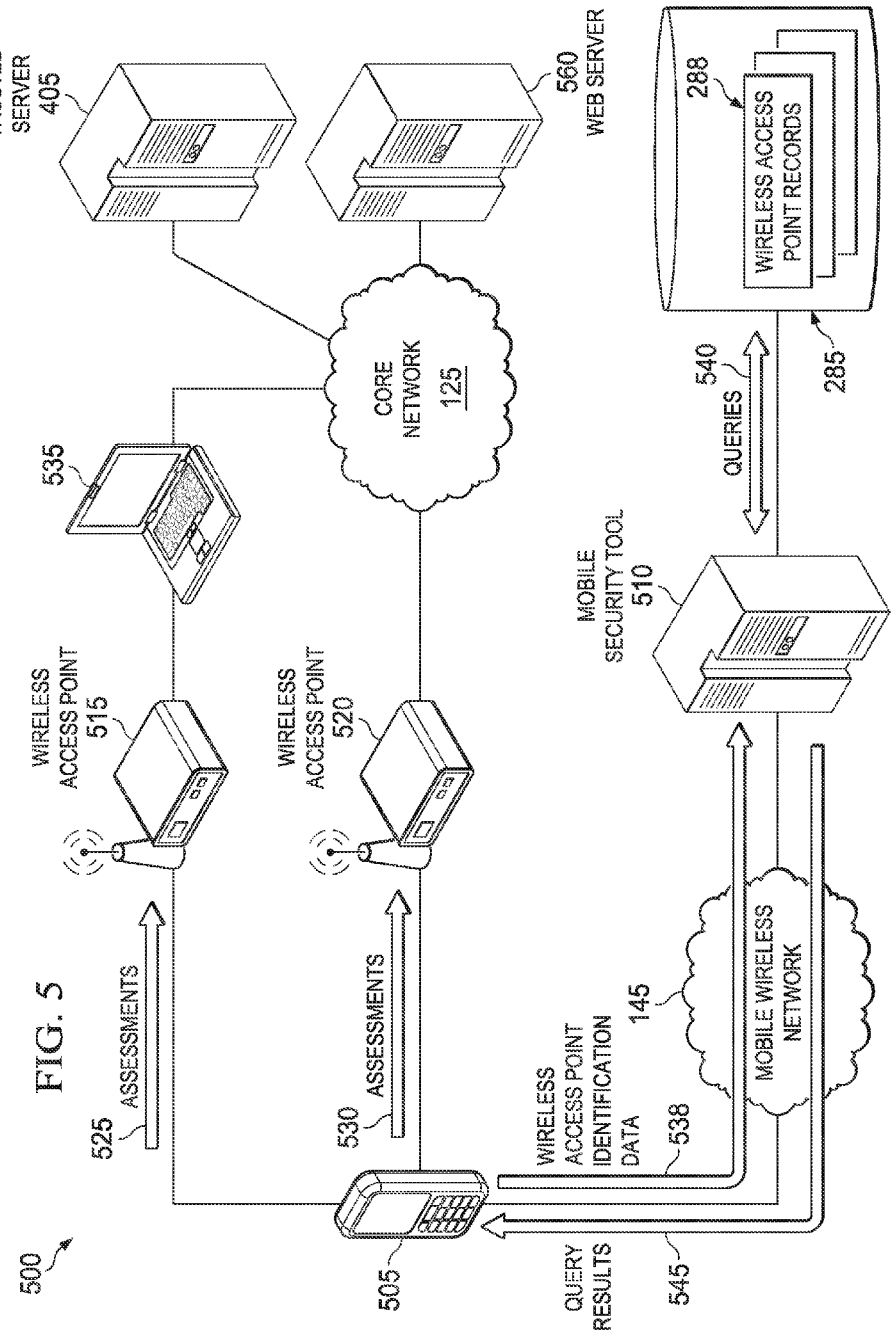

MOBILE RISK ASSESSMENT

RELATED APPLICATIONS

This patent application claims the benefit of priority under 35 U.S.C. §120 of U.S. Provisional Patent Application Ser. No. 61/548,194, filed Oct. 18, 2011, entitled "MOBILE RISK ASSESSMENT", and U.S. Provisional Patent Application Ser. No. 61/548,224, filed Oct. 18, 2011, entitled "MOBILE RISK ASSESSMENT", which are each expressly incorporated herein by reference in their entirety.

This application is a continuation (and claims the benefit of priority under 35 U.S.C. §120 of U.S. application Ser. No. 13/339,221, filed Dec. 28, 2011, entitled "MOBILE RISK ASSESSMENT," Inventors Prasanna Ganapathi Basavapatna, et al. The disclosure of the prior application is considered part of (and is incorporated by reference in) the disclosure of this application.

TECHNICAL FIELD

This disclosure relates in general to the field of computer security and, more particularly, to security of mobile computing devices.

BACKGROUND

The Internet has enabled interconnection of different computer networks all over the world. The ability to effectively protect and maintain stable computers and systems, however, presents a significant obstacle for component manufacturers, system designers, and network operators. This obstacle is made even more complicated due to the continually-evolving array of tactics exploited by malicious software authors. Moreover, computing environments themselves are evolving through the rapid proliferation and popularity of mobile computing devices, including smart phones, tablets, laptops able to connect to the Internet using wireless or mobile communication networks employing such technology as WiFi, WiMAX, 3G, 4G, CDMA, GSM, LTE, and others. As the number of mobile or wireless-enabled computing devices explodes, computer security providers are attempting to develop programs and tools for managing security on these devices and adapting computer security services to new and evolving security issues with mobile computer devices, including network-based threats, mobile operating system- and mobile application-specific vulnerabilities, and so on. Additionally, the rapid deployment of mobile computing devices has also introduced new generations of users connecting to wireless and mobile networks, in some cases introducing a lower security awareness on the part of the devices' users.

BRIEF DESCRIPTION OF THE DRAWINGS

FIG. 2 is a simplified block diagram of an example system including an example mobile risk assessment engine in accordance with one embodiment;

FIG. 3 is a representation of an example use of a compromised wireless access point;

FIGS. 4A-4D illustrate examples of assessing wireless access points in accordance with at least some embodiments;

FIG. 5 is a schematic representation of assessments of multiple wireless access points in accordance with at least some embodiments;

Like reference numbers and designations in the various drawings indicate like elements.

DETAILED DESCRIPTION OF EXAMPLE EMBODIMENTS

Overview

Figure 1:
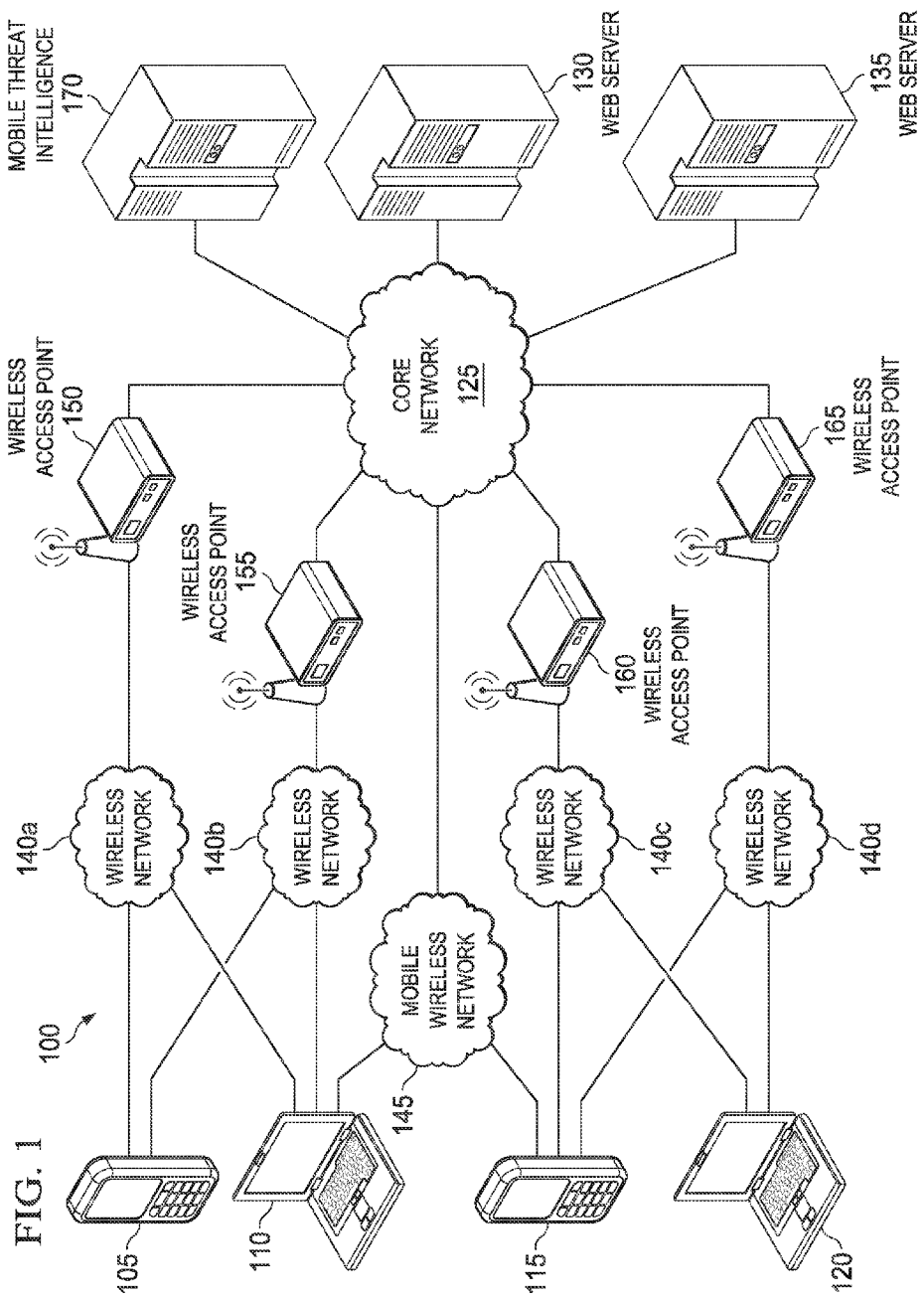
FIG. 1 is a simplified schematic diagram of an example communication system including one or more mobile computing devices in accordance with one embodiment.

In general, one aspect of the subject matter described in this specification can be embodied in methods that include the actions of receiving a query from a particular endpoint device identifying a particular wireless access point encountered by the particular endpoint device, identifying pre-existing risk assessment data for the identified particular wireless access point, and sending query result data to the particular endpoint device characterizing pre-assessed risk associated with the particular wireless access point.

Further, in another general aspect, a system can be provided including at least one processor device, at least one memory element, and a wireless access point risk assessor. The wireless access point risk assessor, when executed by the processor, can receive a query from a particular endpoint device identifying a particular wireless access point encountered by the particular endpoint device, identify pre-existing risk assessment data for the identified particular wireless access point, and send query result data to the particular endpoint device characterizing pre-assessed risk associated with the particular wireless access point. In some instances, the system can also include a device risk assessment tool adapted to calculate a risk profile for the particular endpoint device based on a set of device attributes including risk associated with wireless access points accessed by the particular endpoint device.

These and other embodiments can each optionally include one or more of the following features. A risk assessment of the particular wireless access point can be completed with the particular endpoint device. Risk assessment feedback data can be received from the endpoint device in connection with at least one assessment task performed by the particular endpoint device. The received risk assessment feedback data can be used to determine a risk profile for the particular wireless access point. The pre-assessed risk associated with the particular wireless access point can be considered in the determination of the risk profile. The feedback data can include at least one of a service set identifier (SSID), data describing encryption used by the wireless access point, splash page information, and wireless access point password information. The risk assessment can include the particular endpoint device attempting to communicate with a trusted endpoint over the particular wireless access point, and monitoring the attempted communication with the trusted endpoint over the particular wireless access point to assess risk associated with the particular wireless access. Attempting to communicate with the trusted endpoint can include attempting to establish a secured connection between the particular endpoint device and the trusted endpoint, and establishing the secured connection can include receiving expected trust verification data from the trusted endpoint. Receipt of data other than the expected trust verification data can be presumed to indicate that the particular wireless access point is untrustworthy, suggesting higher risk associated with the particular wireless access point. Participating in the risk assessment of the particular wireless access point can include facilitating communication of the expected trust verification data to the particular endpoint device in advance of the particular endpoint device attempting to communicate with the trusted endpoint over the particular wireless access point. Participating in the risk assessment of the particular wireless access point can include identifying, to the particular endpoint device, the trusted endpoint device from a plurality of available trusted endpoint devices in advance of the particular endpoint device attempting to communicate with the trusted endpoint over the particular wireless access point.

Further, embodiments can each optionally include one or more of the following features. Pre-existing risk assessment data for the identified particular wireless access point can be generated in connection with at least one previous encounter with the particular wireless access point by an endpoint device. The previous encounter with the particular wireless access point may have been made, for example, by an endpoint device other than the particular endpoint device. The pre-existing risk assessment data for the identified particular wireless access point can be identified from risk assessment records including pre-existing risk assessment data for a plurality of wireless access points identified by wireless-enabled endpoint devices. The query can include geo-positional data indicating a location of at least one of the particular endpoint device and the particular wireless access point. The query result data can be generated based at least in part on the pre-existing risk assessment data for the identified particular wireless access point and location identified in the geo-positional data. A risk profile can be calculated for the particular endpoint device based on a set of device attributes including risk associated with wireless access points accessed by the particular endpoint device. A graphical indicator of risk associated with the particular wireless access point can be caused to be presented at the particular endpoint device. The query can be sent over a secure connection other than a wireless network associated with the particular wireless access point. The secure connection can be implemented over at least one of a wireless mobile broadband connection and a VLAN tunnel.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

Example Embodiments

FIG. 1 is a simplified block diagram illustrating an example implementation of a computing system 100 including a plurality of endpoint computing devices (e.g., 105, 110, 115, 120) capable of accessing one or more core networks (e.g., 125), at least partially wired networks, the Internet, etc. including machines (e.g., web servers 130, 135) and hosted resources in the core network 125. For example, endpoint computing devices can access the core network 125 over one or more wireless access networks (e.g., wireless access networks 140a, 140b, 140c, 140d, 145), including networks utilizing various wireless network technology and protocols including WiFi networks, mobile broadband networks (including GSM, CDMA, 3G, 4G, LTE, etc.), WiMAX networks, Bluetooth, among others. In some instances, endpoint devices 105, 110, 115, 120 can be capable of communicating in a plurality of different wireless communication environments. For instance, an endpoint device can be adapted to communicate in both a mobile broadband network as well as a WiFi network.

In the example computing system 100, endpoint computing devices 105, 110, 115, 120 can access a core network 125 over a wireless access network (e.g., 140a, 140b, 140c, 140d,) using a particular wireless access point (e.g., 150, 155, 160, 165) capable of facilitating access to core network 120 over a corresponding wireless access network (e.g., 140a, 140b, 140c, 140d, 145). Wireless access points can include one or more devices adapted to communicate wirelessly, over radio signals, with one or more endpoint devices and connect an endpoint device to a wired network connection, router, or other network element or network. Wireless access points 150, 155, 160, 165 can themselves include wireless routers, universal repeaters, WiFi arrays, wireless bridges, wireless Ethernet adapters, mobile access points, and the like.

Through the proliferation of wireless-enabled endpoint devices and the similar expansion of wireless access points in users' homes, places of employment, schools, retail outlets, restaurants, coffee shops, airports, communities, etc., new computer security threats and vulnerabilities are being introduced. In some implementations of computing system 100, a mobile security tool 170 can also be provided to assist in facilitating security of wireless-enabled endpoint devices. Mobile security tool 170 can include one or more computing devices and software modules, including devices and software remote and/or local to endpoint devices using security functionality and services provided through mobile security tool 170. In some instances, mobile security tool 170 can communicate with endpoint devices over a network connection, including wireless networks. Such connections, in some instances, can be encrypted or otherwise secured and permit mobile security tool 170 to upload, send, push, or otherwise communicate security information and services to a client endpoint device. In some instances, mobile security tool 170 can interact with client endpoint devices and receive data including security requests, device attribute data, threat data, feedback data, and other information that the mobile security tool 170 can use and respond to in connection with security services and functionality provided through mobile security tool 170 to wireless-enabled computing devices (e.g., 105, 110, 115, 120).

In general, "servers," "clients," and "computing devices," including devices used to implement mobile security tool 170, can comprise electronic computing devices operable to receive, transmit, process, store, or manage data and information associated with the software system 100. As used in this document, the term "computer," "computing device," "processor," or "processing device" is intended to encompass any suitable processing device. For example, the system 100 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems.

Servers, clients, and computing devices (e.g., 105, 110, 115, 120, 150, 155, 160, 165, 170) can each include one or more processors, computer-readable memory, and one or more interfaces, among other features and hardware. Servers can include any suitable software component or module, or computing device(s) capable of hosting and/or serving a software application or services (e.g., services of a mobile security tool 170), including distributed, enterprise, or cloud-based software applications. For instance, servers can be configured to host, serve, or otherwise manage web services or applications, such as SOA-based or enterprise web services, or applications interfacing, coordinating with, or dependent on other enterprise services, including security-focused applications. In some instances, a server, system, subsystem, or computing device, including mobile security tool 170, can be implemented as some combination of servers that can be hosted on a common computing system, server, server pool, or cloud computing environment and share computing resources, including shared memory, processors, and interfaces.

Endpoint devices 105, 110, 115, 120 can include desktop, laptop, and tablet computing devices, as well as other computing devices such as smartphones, personal digital assistants, video game consoles, internet-enabled televisions, and other devices capable of connecting wirelessly to an at least partially wired network over one or more wireless technologies and protocols. Attributes of endpoint devices 105, 110, 115, 120 can differ widely from device to device, including the operating systems and collection of software programs loaded, installed, executed, operated, or otherwise accessible to the device. A device's set of programs can include operating systems, applications, plug-ins, applets, virtual machines, machine images, drivers, executable files, and other software-based programs capable of being run, executed, or otherwise used by the respective devices (e.g., 105, 110, 115, 120). Other device attributes can also include peripheral devices connected or otherwise accessible to the device, and the types of network technology for which the device is adapted.

Each endpoint device can include at least one graphical display device and user interfaces allowing a user to view and interact with graphical user interfaces of applications and other programs provided in system 100. In general, endpoint devices can include any electronic computing device operable to receive, transmit, process, and store any appropriate data associated with the software environment of FIG. 1. It will be understood that there may be any number of endpoint devices associated with system 100, as well as any number of endpoint devices external to system 100. Further, the term "client," "endpoint device," and "user" may be used interchangeably as appropriate without departing from the scope of this disclosure. Moreover, while each endpoint device may be described in terms of being used by one user, this disclosure contemplates that many users may use one computer or that one user may use multiple computers.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Turning to FIG. 2, a simplified block diagram 200 is shown of an example system including an example implementation of a mobile security tool 205. In FIG. 2, mobile security tool 205 is shown within a computing environment including at least one mobile endpoint device 210 adapted to access one or more at least partially wired networks 125, including core networks such as the Internet or LAN, via one or more wireless access networks 140, 145, including other computing devices, such as web servers 215, present on the network 125.

Wireless-enabled endpoint device 210 can include one or more processors 218 and memory elements 220 used to execute software stored, downloaded, or otherwise accessible to the device 210. Endpoint device 210, in some instances, can further include a mobile wireless adapter 222, wireless adapter 225, operating system 228, various programs, applications, and other software including software implementing a client security tool 230. Wireless adapter 222 can include software and hardware components implementing a wireless network interface controller capable of connecting the endpoint device 210 to one or more wireless, radio-based communication networks, such as WiFi-based networks (e.g., IEEE 802.11), Bluetooth networks, WiMAX networks, and the like. Additionally, in some implementations, endpoint device 210 can further include a mobile wireless adapter 225 allowing the endpoint device to connect to wireless, radio-based mobile broadband networks implemented, for instance, using cellular telephone networking infrastructure and the like, including mobile networks employing GSM, CDMA, 3G, 4G, LTE, and other technologies and protocols. Adapters 222, 225 can include antennae and other hardware for transmitting and receiving radio signals to and from wireless access network elements in access networks 140, in particular wireless access points (e.g., 232, 234).

Mobile security tool 205 can also include one or more processor devices 238 as well as memory elements 240. Mobile security tool 235 can include a mobile risk assessor 235 adapted to calculate risk of a wireless-enabled endpoint devices (e.g., 210), including endpoint devices configured for communicating over mobile access networks. Mobile security tool 205 can interact with one or more wireless-enabled endpoint devices (e.g., 210) in connection with the performance of one or more computer risk assessment tasks contributing to the calculation of the exposed risk for a particular endpoint device. For instance, mobile security tool 235 (e.g., using mobile risk assessor 235) can interact with client security tool 230 to coordinate the collection of data at the endpoint device 210 for assessment by mobile risk assessor 235. Indeed, mobile risk assessor 235 can include a device coordinator 255 adapted to identify and communicate with endpoint devices 210 utilizing risk assessment services provided by the mobile risk assessor 235. In some instances, mobile risk assessor 235 can provide risk assessment services for a plurality or grouping of wireless-enabled endpoint devices, for instance, based on an agreement or contract between a provider of computer risk assessment services and device owners, administrators, operators, internet or mobile service providers, device manufacturers, and/or other entities associated with a particular wireless-enabled computing device.

Mobile risk assessor 235 can calculate risk exposed to a particular endpoint device based on a variety of factors and inputs. Indeed, different types of risks and risk scenarios can be calculated for a particular endpoint, including dynamically changing risk. Risk can change dynamically on wireless endpoint devices 210 particular as they migrate, given their portable nature, from one physical, network, or computing environment to another. Risk calculation module 260 can be used, for example to calculate computer risk, including multiple types of risk exposed to a particular endpoint device.

As an example, data can be collected from endpoint device 210, for instance, through security scans of the endpoint device 210, that describe attributes of the device 210, for instance, using data collection engine 242 of client security tool 230, and other data collection utilities, used in the connection with the device. For example, a particular operating system (e.g., 228), patches and updates, corresponding to operating system 228, as well as other programs and application (including "mobile apps") operating in connection with operating system 228 can be detected together with information pertaining to the operating system 228 and other programs executed, installed, or accessed on the endpoint device 210. Such information can be shared, or communicated, by mobile client device 210 with mobile security tool 205, for instance, over an at least partially secured network connection, providing mobile risk assessor 235 data for use in determining one or more risk profiles for the endpoint device 210. For instance, continuing with the present example, attributes of endpoint device's (e.g., 210) operating system can be assessed, such as the patches or updates installed on the operating system, for instance, by discovering the latest set of updates and/or patches for the operating system, by determining an ideal version or update for the operating system and comparing these against what is actually installed on the endpoint device, or by identifying known vulnerabilities for the particular operating system installation, etc. In some instances, data collected (e.g., by data collection engine 242) from the endpoint device 210 can describe operating system attributes that are out-of-date, vulnerable to security threats, or otherwise suboptimal and expose the endpoint device to particular know security threats, defining vulnerabilities for the endpoint device.

Depending on the severity of identified security risks or vulnerabilities, as well as the severity of threats determined (by mobile risk assessor 235) to confront a device with a particular identified set of attributes (or vulnerabilities), risk calculation module 260 can determine a risk profile for the endpoint device 210. The risk profile can pertain to a particular subsystem or category of functionality of the endpoint device, or represent an aggregate risk facing the endpoint device. At least a portion of such risk assessment calculations and results can be communicated to the endpoint device 210 and may be rendered by the endpoint device 210 or programs executing on the endpoint device (such as the reporting engine 245 of client security tool 230) to present and communicate risk assessment scores, profiles, or other results to a user or an administrator tasked with remedying threats and vulnerabilities facing the device. In some instances, risk assessment results generated using mobile risk assessor 235 can be communicated to third-party devices, such as an administrator system used by IT personnel and other administrators tasked with managing security and risk for a particular device or subsets of devices.

Client security tool 230 and mobile security tool 205 can interact and operate cooperatively to realize one or more security tasks for use in assessing risk of an endpoint device 210. Such tasks can include the detection of computer risks and threats, as well as the identification and launching of countermeasures for dealing with and mitigating the detected risks. A number of security risks potentially threatening wireless-enabled endpoint devices (e.g., 210), including insecure network connections, malware, viruses, unauthorized access, identity and data theft, among many other threats. Further, some security risks facing wireless-enabled devices can be particular to devices that communicate within wireless network environments, including wireless access networks (e.g., 140, 145). For instance, with the proliferation of WiFi hotspots, and other wireless access networks, rogue wireless access points have emerged as a popular tool for unscrupulous users to infect, phish, or otherwise compromise wireless-enabled endpoint devices unfortunate enough to attempt to access networks, such as the Internet, over the rogue wireless access point.

In some implementations, mobile risk assessor 235 of mobile security tool 205 can including an access point risk manager 265 adapted to assist in identifying and assessing risks involving wireless access points (e.g., 232, 234) capable of being accessed by one or more wireless-enabled endpoint devices (e.g., 210). Access point risk manager 265 can include one or more modules providing functionality for assessing risk of particular wireless access points (e.g., 232, 234). For instance, access point risk manager 265 can include a query engine 275, access point record manager 278, access point assessment module 280, certificate manager 281, tunneling broker 282, among other modules and combinations thereof. In some implementations, access point risk manager 265 can interact and operate cooperatively with an access point coordinator 250, for instance, included with client security tool 230. An example access point coordinator 250 can operate locally to a particular wireless-enabled endpoint device (e.g., 210) and include functionality provided by modules such as an access point monitor 270, access point risk avoidance module 272, among other modules and implementations.

An access point coordinator 250 of a client security tool 230 can be used to monitor and collect data relating to a particular endpoint device's interactions with one or more wireless access points (e.g., 232, 234). For instance, a wireless endpoint device (e.g., 210) can detect the availability of particular wireless access networks (e.g., 140*a-b*) by receiving signals from corresponding wireless access points (e.g., 232, 234). Upon identifying wireless access points within a given location, access point coordinator 250 can communicate with the wireless access points, for instance, using access point monitor 270 and even attempt to connect to servers 215 on a wired network 125 over the wireless access points so as to collect data pertaining to the discovered wireless access points. Access point monitor 270 can cause data collected from various wireless access points (e.g., 232, 234) to be forwarded to mobile security tool 205 for processing and assessment, for instance, by access point risk manager 265.

Access point risk manager 265 can receive data collected by access point coordinators operating on a plurality of different wireless-enabled endpoint devices (e.g., 210) describing attributes and behavior of a plurality of different wireless access points (e.g., 232, 234). From the data received from access point coordinators 250 (e.g., collected by access point monitors 270), access point risk manager 265 can utilize access point record manager 278 to build data records (e.g., wireless access point (WAP) records 288) describing and documenting attributes of wireless access points discovered by endpoint devices (e.g., 210).

Data collected by access point monitor 270 can describe attributes or behavior of a particular wireless access point that can be used as a basis for predictively determining that a particular wireless access point is a comprised, risky, or rogue access point—in other words, a wireless access point that is operating as, appears to be operating as, or that it is susceptible to operation as a mechanism for performing malicious actions against endpoint devices. Similarly, data collected by an access point monitor 270 documenting one or more encounters with a particular wireless access point can also be used to predictively determine that the particular wireless access point is a reasonably safe, reliable, legitimate, or otherwise trustworthy access point.

In some instances, assessing data collected by one or more endpoint devices to determine the risk profile of a particular wireless access point can be performed at the endpoint device 210 itself, at the mobile security tool 205 (e.g., using an access point assessment module 280), or a combination of the endpoint device 210 and the mobile security tool 205. Further, the risk profile determined for a particular wireless access point need not be binary (i.e., risky or safe). Indeed, in some implementations, depending on the data collected for a particular wireless access point as well as the amount of collected data (i.e., from several monitoring instances), and consistency of the collected data, the risk profile of a particular wireless access point can be graded or scored more granularly, for instance, on a continuum, e.g., from "confirmed rogue" to "confirmed safe."

In some implementations, client security tool 230 (using access point coordinator 250) and mobile risk assessor 235 (e.g., using access point risk manager 265) can coordinate to perform a choreographed interaction with a particular wireless access point in order to collect data from and assess the security of the particular wireless access point. For example, endpoint device 210 can use wireless adapter 222 to identify a particular wireless access point. To establish a controlled environment for performing checks against the wireless access point, client security tool 230 can coordinate with (in some cases, a remote) access point risk manager 265 to identify a trusted server or endpoint on core network 125. For instance, the trusted server or endpoint can be a device controlled, for instance, by mobile security tool 205, or the operators of mobile security tool 205, for which particular security tokens, keys, certificates, etc. are known, so as to identify whether unscrupulous actors are utilizing the tested wireless access point to attack or compromise endpoint devices using the wireless access point, for instance, using a man-in-the-middle attack. Further, certificates, tokens, hash functions, encryption keys, and the like can be managed for the trusted server, for instance, using certificate manager 281.

Upon attempting to establish communication with the trusted server over a particular wireless access point under test, client security tool 230 (e.g., using access point monitor 270) can monitor the behavior of the tested wireless access point. Client security tool 230 can report the collected data to mobile risk assessor 235. In some instances, access point monitor 270 can include logic for identifying that a particular wireless access point is likely rogue or compromised, and the access point monitor's 270 assessment can be communicated to and logged by the mobile security tool 205. In other instances, access point risk manager 265 can utilize data reported by the client security tool 230 to assess (e.g., using access point assessment module 280) the security of the tested wireless access point or confirm an assessment of security tool 230. Further, in some instances, access point risk manager 265 can utilize data reported from multiple encounters with the particular tested wireless access point to reach a particular determination or assessment of the wireless access point's security.

In some example implementations, mobile security tool 205 can assist in securing a mobile client device 210 participating in the monitoring or assessment of a particular wireless access point from potential threats posed by rogue wireless access points. In addition to coordinating a controlled environment for assessing a wireless access point (e.g., using a trusted server to establish an initial communication over the wireless access point), mobile security tool 205 can also be used to assist in further insulating the mobile client device 210 from threats. For instance, if it is determined that a particular wireless access point is compromised, mobile security tool 205, for instance, using tunneling broker 282, can assist in coordinating and establishing a secure VPN tunnel over the compromised wireless access point for use by the endpoint device 210. Through the use of a VPN tunnel, endpoint device 210 can nonetheless utilize the wireless access network of the compromised, or rogue, wireless access point while enjoying a level of security. Additionally, a VPN tunnel can also be established for use by the endpoint device 210 for use in communicating with mobile security tool 205. For instance, there would be a high incentive for a rogue wireless access point to block or alter data intercepted over the access point from the mobile client device that attempts to communicate the rogue status of the access point to the mobile security tool 205. Accordingly, communication of such data, regarding the status and behavior of a particular wireless access point (including trusted wireless access point) can be encrypted, for instance using a VPN tunnel, or through the use of a different wireless access network, including a wireless mobile access network, determined to be more secure or trusted than other available wireless access networks.

In addition to facilitating secure communication channels, for instance, through the establishing of VPN connections for use by a participating endpoint device in connection with a particular security or risk assessment of a particular wireless access point, mobile security tool 205 and mobile client device 210 can also tailor other actions and functionality based on an assessment of a particular wireless access point. For example, in some implementations, records 288 maintained by a mobile security tool 205 documenting previous encounters with various wireless access points (e.g., 232, 234) can be used to perform a pre-assessment query of a particular wireless access point. As an illustrative example, an endpoint device 210 can detect a first wireless access point 232 and send data to the mobile security tool 205 identifying the wireless access point 232, such as a detected SSID or other identifier for the wireless access point 232, as well as, in some cases, geo-positional data corresponding to the geographic location of the wireless access point 232 and/or endpoint device 210. From the data identifying the wireless access point 232, access point risk manager 265 can perform a query, for instance, using query engine 275, of WAP records 288, to determine whether previously collected data exists for the identified wireless access point 232 and whether previously collected data indicates that the wireless access point 232 is likely trustworthy or not. The results of the query can then be forwarded to the endpoint device 210. Further, based on the query results, endpoint device can perform a corresponding action, such as connecting to the wireless access point 232 without a check of the wireless access point 232 (e.g., based on a query result indicating that the wireless access point 232 is likely trustworthy), attempting to assess (e.g., with cooperation of and coordination with mobile security tool 205 as described above) the security of the wireless access point (e.g., when the query result indicates that no records have been generated for the wireless access point or when there is some question regarding the wireless access point's 232 trustworthiness), blocking the ability of the endpoint device 232 to connect to the wireless access point 232 (when the query result indicates that the wireless access point is most likely a rogue access point), among other examples. Indeed, in some instances, mobile security tool 205 can assess the results of a query of WAP records 288 and send a suggestion or instruction to endpoint device 210 regarding actions the endpoint device 210 should take with regard to the detected wireless access point 232.

Data collected through the assessment of various wireless access points, and endpoint devices' interactions with particular wireless access points can be considered in more generalized assessments of a given device's risk exposure or security. For instance, data collected from an endpoint device 210, for instance, using data collection engine 242, can be shared with and maintained by mobile security tool 205, for instance, in device records 290. Data collected from an endpoint device 210 describing attributes of the device can be considered among other device-specific data, including an endpoint device's interaction with particular, known wireless access points, to generate an aggregate risk assessment of the device as a whole (e.g., using risk calculation module 260). Such data can be collected, for instance, through scans of the device by client security tool 230. In some instances, client security tool (as well as mobile security tool 205) can be a can be adapted to support a variety of different mobile operating environments including RIM Blackberry (QNX), Google Android, Apple iOS, Microsoft Windows Phone, Nokia Symbian OS, and others. Client security tool 230, in some examples, can be implemented as an application downloaded from a trusted site or distributed via application stores, such as the Android Market or iTunes. Client security tool 230 (e.g., using data collection engine 242) can scan the device. A scan can include includes integrity check of key libraries, files/change control or trusted code execution within the endpoint device and based on reputation information of wireless access points, weakness of authentication method, secure connection protocol, encryption method, as well as other security tasks relating to device risk or vulnerability assessment.

Data collected by client security tool 230 can be used in risk assessments of the device. Such assessments can further determine, for example, whether, where, and/or how a particular endpoint device (or group of endpoint devices) is at risk. In addition to exposure to compromised wireless access points, risk of wireless-enabled devices can consider many other sources, including network threats, operating system- (e.g., 228) or application-specific vulnerabilities, weak data encryption, unsecured connections, phishing sites, and so on. Additionally, device records 290 documenting various threats and risks for certain devices with certain attributes under certain conditions can be used, for example, by risk calculation module 260, in risk assessments of other endpoint devices, multi-endpoint systems, categories of particular endpoint devices, among other examples. Additionally, risk assessment of a particular endpoint device can also include the consideration and factoring of possible countermeasures present on or available to the endpoint device. In some cases, the presence of relevant countermeasures can be used in the calculation of a risk score for the endpoint device. Further, client security tool 230, in cooperation with mobile security tool 205, can also be used to remedy other threats and vulnerabilities detected on endpoint devices, including the introduction of targeted countermeasures, malware removal, software updates, and other tools and actions.

Turning to FIG. 3, a block diagram 300 is shown of an example malicious use of a compromised wireless access point 310. For instance, an example man-in-the-middle attack is illustrated. An example endpoint device 305 can communicate with an example wireless access point 310 over a wireless access network 308 to access resources and/or services served by an example server 315 on core network 312. In the particular example of FIG. 3, endpoint device 305 may attempt to participate in a transaction with a server 315 that involves the sending sensitive data, such as credit card information, over the wireless access point 310, under the auspices that a secured session has been established with the server 315, for instance, using secure socket layer (SSL) protection. Accordingly, endpoint device 305 can expect a certificate, or some other token from server 315 to establish the secured session. A malicious computing device 320 can control or otherwise use wireless access point 310 to snoop traffic on the wireless access point 310. Indeed, malicious device 320 can intercept and detect a request 322 from the endpoint device 305 requesting a secure connection with server 315. Further, rather than sending the certificate 325 sent from the server 315, malicious device 320 can send its own substitute certificate 330 and mimic server 315 by establishing a secured session with the endpoint device 305 and coax the user of the device 305 into confidently sharing sensitive personal data over the secured connection. Malicious device 320 can intercept communications (e.g., 335) transmitting such data (as well as in some cases proxying the data to server 315 so as not to arouse the suspicions of the device's 305 user) and steal the information included in the sensitive data 335 for use in other potentially nefarious acts.

Figure 4C:
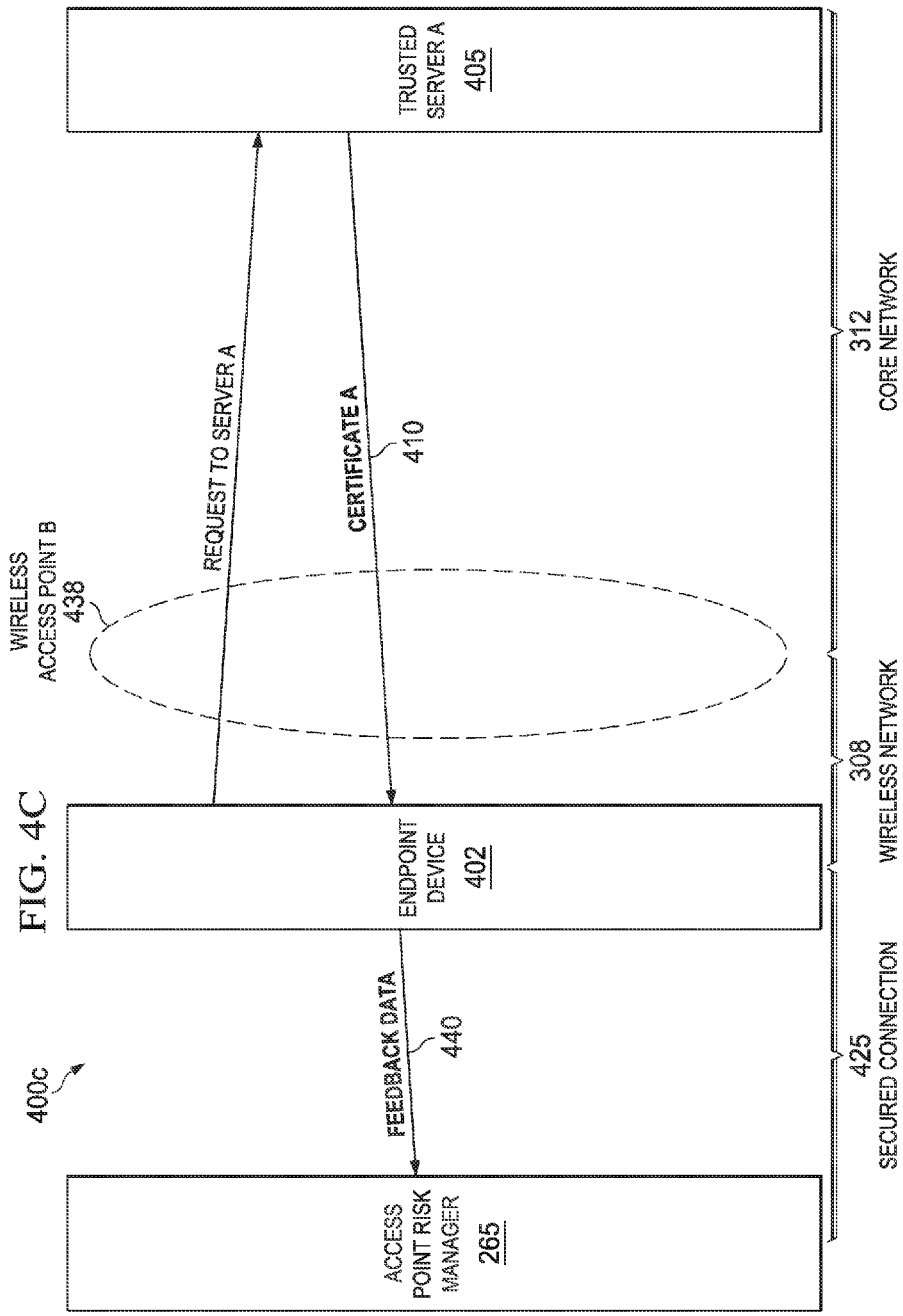

FIGS. 4A-4D illustrate examples of assessing wireless access points in accordance with at least some embodiments. Indeed, the example approaches and techniques described in the examples of FIGS. 4A-4D can be used to mitigate against attacks such as the example attack described in the example of FIG. 3. In FIG. 4A, a flow diagram 400a is shown illustrating example communications involving an endpoint device 402, wireless access point 310, malicious device 320, access point monitor 420, and trusted server device 405. An endpoint device 402, such as an endpoint device 402 subscribed to, using, or otherwise adapted to consume security services provided by one or more security tools, can detect a particular wireless access point 310 and attempt to use the wireless access point 310 so as to assess security of the wireless access point 310. The endpoint device's interactions with the wireless access point 310 can progress similar to any other typical endpoint device use of the wireless access point 310, for instance, so as not to alert the wireless access point 310 or devices (e.g., 320) operating in connection with the wireless access point 310 that the security of the wireless access point 310 is being analyzed and assessed. For instance, endpoint device 402 can send a request to a particular server, Server A 405, and attempt to established a secured connection with the particular server 405.

The endpoint device 402, in connection with the assessment of the wireless access point 310 can deliberately interact with Server A 405 before commencing other communications using wireless access point 310, based on a pre-identification of Server A as a trusted appliance. Additionally, the interaction with trusted Server A 405 can be pre-choreographed so as to assess the risk of the wireless access point 310 in an at least somewhat controlled environment. For instance, the particular certificate, token, encryption keys, digital signatures, watermarks, and other data to be sent by the trusted Server A 405 in connection with the establishing of a secure connection with endpoint device 402 can be pre-negotiated, pre-accessed, cached, or otherwise be known to the endpoint device 402 prior to the endpoint device 402 attempting to initiate a secured session with the trusted server 405. Indeed, in some instances, trusted server 405 can be under the control, or even hosted by, a mobile security tool (e.g., 205 of FIG. 2) associated with the endpoint device 402.

Accordingly, endpoint device 402 can send a request to establish a secured connection with trusted server 405 over wireless access point 310, in this case expecting a particular security certificate 410 to be returned by the trusted server 405, for instance, based on a relationship or familiarity with trusted server 405. Continuing with the example of FIG. 4A, expected certificate 410 can be intercepted by a malicious device 320 utilizing a compromised wireless access point 310, and the malicious device 320 can attempt to substitute the expected certificate 410 with its own certificate 330 so as to coax the endpoint device 402 into establishing a secure connection with the malicious device and mistakenly routing secure traffic over the malicious device 320 (e.g., as in the example of FIG. 3). However, in the example of FIG. 4A, the receipt of a certificate 330 by endpoint device 402 instead of the expected certificate 410 can prompt the endpoint device to suspect that wireless access point 310 is a rogue access point or has been otherwise compromised. Accordingly, endpoint device 402 can report 415 its findings to access point risk manager 265 for use in cataloguing the incidence of a likely compromised or rogue access point. Such reporting or feedback data can be communicated to the access point risk manager 265 over a secured connection 425, such as a VPN tunnel or a mobile broadband connection. Among the reporting and feedback data that an endpoint device can gather and communicate to access point risk manager 265, endpoint device 402 can communicate an identity of the wireless access point 310 (e.g., SSID or other identifier), the type of behavior or characteristics that prompted the report 415, the geographic location near which the wireless access point 310 was detected, whether the wireless access point utilized encryption and what type of encryption was used, whether a password was required, whether a splash page was generated and received upon connecting with access point, among other data describing attributes and behavior of the relevant wireless access point.

Turning to the example of FIG. 4B, in one implementation, discovery of suspicious or untrustworthy behavior on the part of a particular wireless access point 310, such as in the example of FIG. 4A, can cause countermeasures to be enacted to protect an affected endpoint device and counteract threats posed by the wireless access point 310. For instance, as described above, determining that a particular wireless access point 310 is untrustworthy, rogue, or otherwise compromised can trigger countermeasures including the establishing 430 of VPN tunnels for use by the endpoint device in subsequent communications 435 over a particular compromised wireless access point 310. Indeed, in some instances, the VPN tunnel can be established 430 at least in part through communication with trusted server 405 (and/or access point risk manager 265). Tunneling through a compromised wireless access point 310 may be provided for in particular situations, such as when no other wireless access points are available to a particular endpoint device 402 at a given time. In other instances, other countermeasures can be provided, such as the blocking of a particular compromised wireless access point, disabling automatic connection to a wireless access point determined to have a lower degree of trustworthiness, or automatic connection to an alternate wireless access point determined to be less risky.

Turning now to the examples of FIG. 4C, in certain instances, risk inherent in using a particular wireless access point can be assessed to determine that the wireless access point is likely secure, legitimate, or otherwise trustworthy. Ex ante, it may be that an endpoint device 402 is not aware of a particular wireless access point's reputation for trustworthiness, and the endpoint may approach the assessment of the wireless access point as it would any other. For instance, endpoint device can attempt to assess the wireless access point 438 by walking through the establishment of a secure connection with a trusted server 405. Such an assessment can proceed as in the example of FIG. 4A, however, in this example, the expected certificate 410 is returned from the trusted server 405 to the endpoint device 402, suggesting to the endpoint device 402 that the wireless access point 435 is potentially not a rogue or compromised access point. Indeed, as in the example of FIG. 4A, endpoint device 402, in the example of FIG. 4C, can report its findings concerning wireless access point 438 to access point risk manager 265, for example, for use by access point risk manager 265 in assisting in the assessment of future encounters with the particular wireless access point 438 (such as described in more detail, for instance, in the example of FIG. 5 below).

Turning to FIG. 4D, in some implementations, it may be determined that it is not sufficient to have a single "clean" result returned for an assessments of a particular wireless access point (such as in the example of FIG. 4C) before determining reliably that a particular wireless access point is secure or trustworthy. For instance, in the example of FIG. 4D, a more sophisticated wireless access point 460 (or malicious device 465 executing in connection with the wireless access point 460 or user of malicious device 465) can anticipate that some endpoint devices will attempt to assess the trustworthiness of the wireless access point with a "test" connection before sending the "live" data the malicious device 465 is actually interested in capturing. Such intelligence could be gleaned by the malicious device 465 (or user), for instance, based on previous experiences with such a system or other familiarity with the system. Accordingly, a malicious device 465 may wait to initiate a man-in-the-middle or other attack until the endpoint device's connection with the wireless access point 460 matures. For instance, the malicious device may allow one or more first attempts to establish a particular secure connection to proceed without intervening, so as to trick the endpoint device and/or access point risk manager into assuming that the wireless access point 460 is secure. Indeed, as shown in the example of FIG. 4D, initial feedback data 445 can be reported to the access point risk manager 265 from the endpoint device 402 reporting that an expected certificate 410 was returned from the trusted server 405 without incident.

Continuing with the example of FIG. 4D, a malicious device 465 can attempt to phish other secure communications participated in by the endpoint device 402, assuming that such attempts will not be monitored. For instance, rather than returning the legitimate certificate 450 of Server B 470, malicious device 465 can attempt to mimic Server B 470 and replace certificate 450 with its own certificate 330. Such attempts, however, can also be dealt with using endpoint device 402 and access point risk manager 265. For example, rather than assessing a particular wireless access point 460 a single time for trustworthiness, an endpoint device (in connection with access point risk manager 265) can make multiple, periodic assessments of a wireless access point 460 during the endpoint's 402 use of the wireless access point 460. For instance, a new risk assessment can be initiated in response to and preceding attempts by the endpoint device to establish secured connections in live (non-assessment-related) transactions over the network 312. Further, multiple different trusted servers can be employed during these multiple risk assessments, so that the malicious device 465 does not recognize repeat communications with the same trusted server and anticipate a risk assessment attempt. For instance, Server B 470 can be a second instance of a trusted server utilized by the risk assessment system. Indeed, in some instances, a risk assessment system can employ techniques to dynamically and randomly rotate the particular trusted server employed, dynamically change the identification, address, or name of the trusted servers, develop trusted relationships with third party servers, such as e-commerce platforms, with which live transactions might be anticipated, employ techniques such as used by botnet systems to make the identities of the trusted servers unpredictable, among other examples.

Accordingly, delayed attempts to interfere with or initiate an attack on a participating endpoint device 402 by a malicious device 465 over a compromised wireless access point 460 can be detected and mitigated. Further, feedback data 455 describing such behavior and characteristics of the wireless access point 460 can be reported and maintained by access point risk manager 265.

Other techniques can also be employed within wireless access point assessment techniques such as those described above. More sophisticated malicious devices taking advantage of compromised wireless access points can identify and anticipate, and dodge wireless access point risk assessment using other techniques. For instance, a malicious device may be able to track and identify recurring certificates or tokens used in a choreographed exchange with a trusted server in connection with a risk assessment. To prevent the detection of a wireless access point assessment, in some implementations, the value or type of certificate, token, signature, etc. used to establish continued authenticity of data exchanged between the endpoint device 402 and trusted server 405 can itself be dynamically changed so as not to have a repeating value. For example, in connection with the launching of a risk assessment on a particular wireless access point, endpoint device 402 can coordinate (for instance, with access point risk manager 265) the identity and address of the particular trusted server to be used in the assessment as well as the particular expected certificate (or other token, etc.) that should be expected from the trusted server. In this way, both the identity of the trusted server and the nature of the certificate can be constantly changed so as to hide its involvement in the risk assessment of a particular wireless access point. Such coordination with a remote access point risk manager 265 or other coordination tool can occur, for instance, over a connection not involving the wireless access point to be assessed. For example, coordination of a risk assessment of a particular wireless access point can be completed over a wireless broadband channel or other, secure connection. Further, while an endpoint's accessing of a particular wireless access point may be the result of the endpoint not having immediate mobile broadband or other connectivity, coordination of a risk assessment can be coordinated in advance, for instance, when such alternate access networks are available. Further, in the event such coordination were not possible (e.g., because of connectivity to a secure channel, or a failure at the pre-coordinated trusted server), access to a particular wireless access network may be automatically denied based on a determination that the trustworthiness of the wireless access network may not be reliably assessed, in some implementations.

While the examples of FIGS. 3, 4A-4D focus on man-in-the-middle type attacks and identifying rogue access points based on the receipt of unexpected certificates, tokens, or other data, it should be appreciated that these examples are non-limiting examples, provided to illustrate, in some cases, more general principles. For instance, in addition to assessing wireless access point risk based on receipt of an unexpected certificate, riskiness of particular wireless access point can be identified based on inconsistencies identified in communications over the wireless access point, such as an unexpected encryption type, unexpected splash page data, unexpected password requirement, among other examples. Further, a degree of confidence in the accuracy or completeness of the data set used to assess the riskiness of the wireless access point can also be considered. For example, if the data set describing the wireless access point is itself incomplete, or the results of the risk assessment inconclusive, then the reliability of the assessment can be of little confidence and actions available for mitigating risk associated with the wireless access point can be withheld.

Turning to FIG. 5, a block diagram 500 is shown illustrating example interactions of an example mobile security tool 510 with one or more wireless-enabled endpoint computing devices 505 used to assess risk at one or more wireless access points 515, 520. One or more of the wireless access points (e.g., 515) can be a rogue wireless access point 515, for instance, used by a malicious device (e.g., 535) to phish or snoop data sent over the wireless access point.

In one example, a wireless-enabled endpoint device 505 can identify a plurality of wireless access points within a particular location and initiate risk assessments of each. For instance, endpoint device 505 can first assess wireless access point 515 and begin the assessment by sending data identifying the first wireless access point 515 to the mobile security tool 510. Data can include identifier data such as the wireless access point's 515 SSID, as well as other information. For instance, in some implementations, an SSID can be reused across multiple wireless access points, such as default or generic SSIDs assigned to out-of-the-box wireless access points. Additionally, in some wireless access points, SSIDs can be changed, and alternate identification data can be used to identify the wireless access point. As examples, other identifier data, as well as data describing attributes of the wireless access point can be identified and included in data sent to the mobile security tool 510, such a geo-positional data corresponding to the location of the wireless access point, time of day the wireless access point was accessed, splash page data used by the wireless access point, sign-in or handshake protocol used by the wireless access point, encryption method used by the wireless access points, etc. A variety of other data can also be used in addition to or in lieu of the above to identify the particular wireless access point including, for instance, the access point's communication channel, BSSID, vendor, supported data rates, type (e.g., managed, unmanaged, etc.), key, and so on.

Mobile security tool 510 can utilize the identification of the first wireless access point 515 from data provided by an endpoint device 505 to perform a query 540 against a corpus of wireless access point assessment records 288 and/or other data (e.g., stored in one or more memory elements or data structures (e.g., 285), such as databases, data objects, and file systems, etc.) to identify whether the first wireless access point 515 has been assessed before, either using endpoint device 505 or some other endpoint device, and what the results of the risk assessment were. Query results 545 can be returned to the endpoint device 505, for instance, over a secure connection or communication channel, including communication over a wireless mobile broadband network 145, to provide the endpoint device 505 with intelligence regarding wireless access point 515 before endpoint device 505 connects to wireless access point 515. Query results 545 can identify data collected in previous risk assessments of the wireless access point 515 allowing endpoint device to process the data and determine the riskiness of the wireless access point 515. In other examples, mobile security tool 510 can determine or identify a risk score or preliminary risk assessment of the wireless access point 515 in connection with the query of WAP records 288 and provide the preliminary risk assessment to the endpoint device 505.

Additionally, each wireless access point (e.g., 515, 520) identified by the endpoint device can be identified and communicated to the mobile security tool to trigger respective queries 540 of WAP records 288. For instance, in addition to sending data 538 respecting an encounter with wireless access point 515, endpoint device 505 can also send data 538 identifying wireless access point 520. Accordingly, query results 545 can be returned for a plurality of different wireless access points (e.g., 515, 520) detected by and available to an endpoint device 505. In some instances, the query data 545 can be used to identify the relative security or trustworthiness of encountered wireless access points 505. In some instances, the query data 545, itself, can communicate such information, such as through the inclusion of risk scores or risk profiles identified for the wireless access points 505. In some instances, such risk profiles (and the query results 545 themselves) can be based on potentially hundreds to millions of assessment data points provided by various endpoint devices to mobile security tool upon encountering (and assessing) the wireless access points.

Upon receiving preliminary risk assessment data or other query results 545 from mobile security tool 510, endpoint device can proceed to conduct assessments of the encountered wireless access points 515, 520, in some cases, in cooperation with mobile security tool 510, one or more trusted servers 405, and other components. In some implementations, the type and extensiveness of the risk assessment performed will be based, at least in part, on the returned query data 545 for the wireless access point 515, 520. Other considerations and attributes can also be considered, such as the identified locations of the wireless access points 515, 520. For instance, if geo-positional data corresponding to the locations of the endpoint device and/or encountered wireless access points indicate that the wireless access points are operating in a public space or a location previously identified as containing one or more malicious or compromised wireless access points, an extensive risk assessment may nonetheless be performed on each of the detected wireless access points 515, 520, even if the query results 545 of one or more of the detected wireless access points 515, 520 indicate particular trustworthiness of the wireless access points.

In some instances, query results 545 indicating particular trustworthiness or security of a wireless access point can result in a less extensive security assessment check of the wireless access point, for instance, to confirm previously-identified attributes of the trustworthy wireless access point (e.g., 520), or skipping of the risk assessment altogether. In instances, where there is some uncertainty as to the trustworthiness of a wireless access point, for instance based on query results 545 that indicate conflicting behavior, or a scarcity (or entire lack) of records 288 pertaining to the wireless access point. Additionally, if query results 545 indicate that a particular wireless access point (e.g., 515) is believed to be compromised, for instance, based on multiple assessments of the wireless access point 515, connections to the wireless access point may be outright denied, or other assessments can be performed, for instance, to collect an additional data point concerning the wireless access point 515 and further confirm (or potentially cast doubt) on a preliminary risk assessment of the wireless access point 515.

Upon completing risk assessment tasks 525, 530 through interactions with encountered wireless access points 515, 520, endpoint device 505 can send feedback data (e.g., such as feedback data 415, 440, 445, 455 of the examples of FIGS. 4A-4D) to mobile security tool 510 communicating data and results collected from the risk assessment tasks. In turn, mobile security tool 510 can supplement its records (e.g., 288) with the latest feedback data reported by an endpoint device 505. Indeed, in some instances, feedback data reported by endpoint device 505 resulting from risk assessment tasks 525, 530 can change the results of future queries involving the assessed wireless access points 515, 520. For instance, a wireless access point 515 may have been identified as potentially trustworthy based on prior WAP records 288, but the most recent risk assessment of the wireless access point 515 (e.g., in connection with endpoint device's 505 encounter and assessment) may have identified attributes or behavior (such as an attempted man-in-the-middle attack) that result in feedback data being added to WAP records 288 that serves as the basis for a subsequent pre-assessment of the wireless access point 515 as compromised.

In one illustrative example, a user may attempt to connect to WiFi networks within an airport, or another public place, using a mobile smartphone. A number of available WiFi networks (or access points) may be detected and displayed to the user. In some instances, rogue mobile access points can lure unsuspecting users into utilizing their connection by adopting a name that suggests legitimacy. For instance, in the Dallas, Tex. DFW Airport, a rogue wireless access point might adopt a name "DFW WiFi," so as to (falsely) suggest to potential users that the access point is maintained by officials of the airport or some other legitimate source. Indeed in some instances, a rogue wireless access point may adopt (i.e., counterfeit) the exact name of an official access point or hot spot, so as to cause users to select (sometimes blindly) the rogue access point over the actual, sponsored access point. In instances where rogue access point detection and/or other access point risk assessment functionality is available to the endpoint devices, such as in some of the previously described examples, the wireless access points encountered by the endpoint device can be assessed for trustworthiness, according to the principles described above. Indeed, in an example where two different wireless access points are presented with the same SSID, it can be determined that there is a high likelihood that one of the two wireless access points is rogue and attempting to mimic the other, resulting in more diligent risk assessment of the wireless access points, as well as feedback data reporting the likely presence of at least one rogue access point at the particular location where the wireless access points were detected (e.g., the airport). Indeed, previous identification of rogue access points at a particular location can cause enhanced scrutiny of future detected wireless access points at that location (e.g., as identified, for example, from GPS or other geo-positional data of the endpoint device). However, in some instances, determining varying trustworthiness of an access point at different instances can also, or instead, be determined to reflect poorly on the confidence of risk assessments for the particular access point. Low confidence in the accuracy of a risk assessment also casts doubt on positive assessments of the access point, low confidence, in some instances, contributing to an overall indication that connection to the wireless access point should be avoided (i.e., because an assessment that the access point is now trustworthy after being assessed as previously untrustworthy, casts doubt on the present assessment's reliability).

In response to pre-assessment queries of existing wireless access point assessment records and/or assessments of detected wireless access points within a particular location, a user of the endpoint device may be presented (e.g., through a display utility of the endpoint device) a user interface identifying the available wireless access points in a location, as well as the relative security or trustworthiness of the detected wireless access points, together with a measure of the relative confidence in the assessments of each detected wireless access point. A user can use this information, for example, to assess the risks of using particular wireless access points. For example, a user may encounter only a single available wireless access point, or a single wireless access point to which the user is able to connect (e.g., because the user does not possess a subscription or password to other detected wireless access points), but may be concerned with connecting over an unknown access network.

Figure 6:
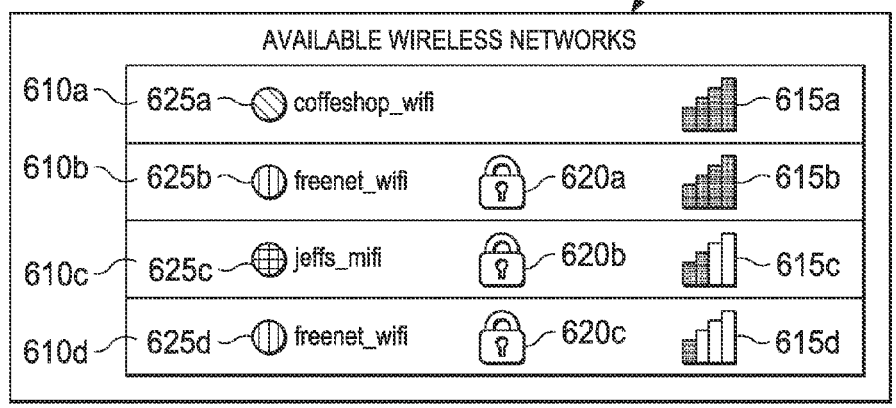
FIG. 6 is an illustration of an at least partial screenshot of an example user interface in accordance with at least some embodiments.

To assist users in understanding risks confronting users devices (and by association, the users themselves), a user interface can be presented to the user using the endpoint device, such as the at least partial screenshot 600 of an example graphical user interface (GUI) 605 shown in FIG. 6. For example, GUI 605 can include a listing of the available wireless networks (or access points) 610*a-d* detected by the endpoint device at a given time and location. Further, names of the wireless access networks can be presented in the list, as well as other attributes of the wireless access networks, including the signal strength of the wireless access point (e.g., at 615*a-d*) and whether the access point is protected or requires a password, etc. (e.g., at 620*a-b*). In addition, one or more status indicators (e.g., such as color-coded status indicators such as 625*a-d*) can be presented in the GUI 605 to indicate the determined trustworthiness of and/or confidence in the assessments of the wireless access points.

As explained above, the determined trustworthiness of a wireless access point, including its displayed status indicator 625*a-d*, can be determined from an aggregation of risk assessments performed on the wireless access point (e.g., identified from queries of wireless access point assessment records) and/or in connection with risk assessments performed by the endpoint device of each wireless access point (e.g., such as shown in the examples of FIGS. 4A-4D). In the example of FIG. 6, status indicators 625*a-d* can be color-coded, for instance, adopting a traffic light pattern, with a green indicator (e.g., 625*a*) suggesting that a particular wireless access point (e.g., 610*a*) is trustworthy, a yellow indicator (e.g., 625*c*) suggesting that the trustworthiness of a wireless access point (e.g., 610*c*) is in question (e.g., 610*c* because too few, contradictory, or no assessments have been performed on the wireless access point), or a red indicator (e.g., 625*b*, 625*d*) suggesting that the trustworthiness of a wireless access point is unacceptably low or in doubt. Determining which of the three color-coded status indicators to assign a wireless access point can be based on a risk assessment score for the wireless access point exceeding one or more thresholds.

In some instances, the risk assessment score of a wireless access score can be conditioned on a variety of factors and can vary depending on the presence of particular factors. For instance, in the example of FIG. 6, a first wireless access point 625*b* named "freenet_wifi" can be detected and, based on previous risk assessments, ordinarily be determined to have a low risk or high trustworthiness score (e.g., normally affording the wireless access point 625*b* a corresponding green-colored status indicator). However, in the example of FIG. 6, a second wireless access point 625*d* is also provided that is also named "freenet_wifi." In such an instance, and in some implementations, the presence of two-identically-named wireless access points can suggest a high likelihood that one of the like-named wireless access points is a rogue access point attempting to impersonate an established, trusted wireless access point. In some instances, a rogue wireless access point (e.g., 625*d*) may do a good enough job mimicking another wireless access point that it can be difficult for rogue access point assessment techniques to differentiate between the identity of the two access points. Accordingly, given that there could be a fifty-fifty chance of either like-named access point being the rogue, a red-colored status indicator 625*b*, 625*d* can be assigned to each wireless access point.

Other examples and implementations and scenarios can fall within the scope of the subject matter disclosed herein. As one example, and continuing with the example of FIG. 6, a GUI 605 displayed to a user of an endpoint device can automatically order a listing of wireless access points within the GUI 605 so as to suggest to the user which wireless access point is the most desirable to use. Such a listing can be based, for instance, on which wireless access point has the most trustworthy reputation or risk assessment score. Other factors can be considered, in addition to risk assessment scores in ordering wireless access points listed in the GUI 605. For instance, the signal strength, encryption protocol used, and other attributes can also be considered in ordering wireless access points within a presented listing, among other examples. Other GUIs can also be generated that employ wireless access point risk assessment data, including GUIs displaying characteristics of an aggregate risk present on a given endpoint device. Such device-based risk assessments, and accompanying GUIs, can include consideration of wireless access point risk exposure to the device.

Figures 7A, 7B:
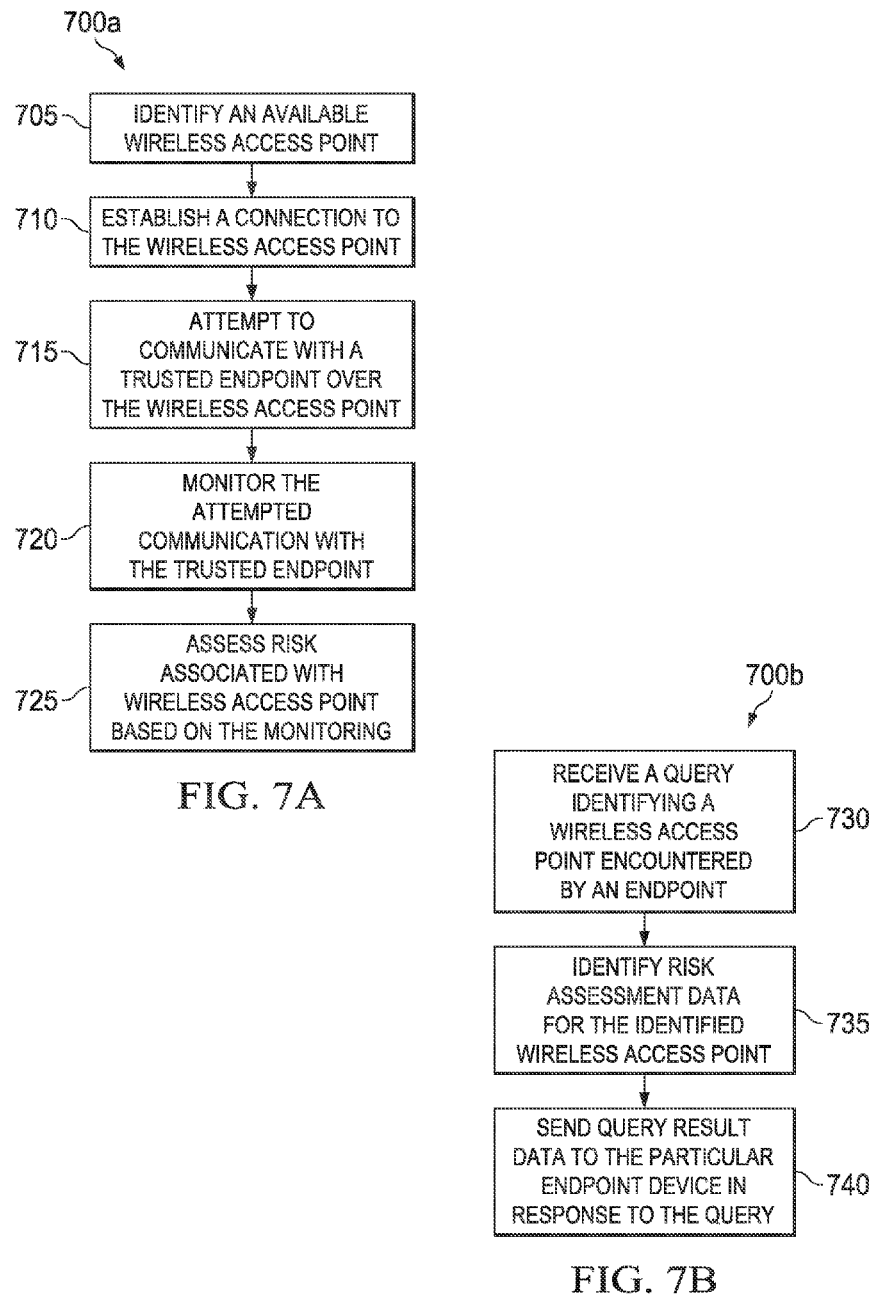
FIGS. 7A-7B are simplified flowcharts illustrating example operations associated with at least some embodiments of the system.

FIG. 7A is a simplified flowchart 700*a* illustrating an example technique for monitoring a wireless access point encountered by a wireless-enabled endpoint device. At least one available wireless access point can be identified 705 by the endpoint device in a particular location. In some instances, multiple wireless access points can be identified as available at the location. A connection can be established 710 with the identified wireless access point by the endpoint device so as to facilitate an attempt 715 to communicate with a trusted endpoint device over the wireless access point. Communication with the trusted endpoint can be established for purposes of creating an at least somewhat controlled environment for assessing risk associated with use of the identified wireless access point. Indeed, the attempted communication 715 with the trusted endpoint can be monitored 720, at least in part, by the endpoint device, to facilitate a risk assessment 725 of the identified wireless access point. In some instances, facilitating risk assessment 725 can include performing at least a partial analysis of data returned during the monitoring 720 or by sending data collected during the monitoring 720 to one or more backend tools for analysis and risk assessment, such as described in the examples above.

FIG. 7B is a simplified flowchart 700*b* illustrating an example technique for pre-assessing risk associated with an identified wireless access point. A query can be received 730 from a wireless-enabled endpoint device that identifies at least one wireless access point encountered by the wireless-enabled endpoint. The query, in some instances, can be received 730 prior to the endpoint device attempting to connect to the wireless access point and in connection with an attempt to assess whether the identified wireless access point is safe to connect to. In response to receiving 730 the query, previously-collected or -generated risk assessment data corresponding to the identified wireless access point can be identified 735. In some instances, such risk assessment data can be a set of data accumulated through multiple, distinct risk assessments of the wireless access point, for instance, in connection with encounters by multiple different endpoint devices. In still other examples, it can be identified 735 that no risk assessment data exists for the identified wireless access point (e.g., because no prior risk assessments have been completed or the WAP identification algorithm failed or has low confidence, etc.). In any event, query result data can be sent 740 to the endpoint device in response to the query, the result data characterizing pre-assessed risk associated with the particular wireless access point. Such query result data can include the identified prior risk assessment data itself, data characterizing an analysis, summary, or assessment of the prior risk assessment data, and can even include instructions for interacting with the identified wireless access point (i.e., based on the pre-assessed risk associated with the wireless access point, as determined from the identified prior risk assessment data). The endpoint device can then use this query result data in connection with interactions with the wireless access point, including monitoring of the wireless access point using techniques similar to those described in the example of FIG. 7A and elsewhere in this specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, diverse user interface layouts and functionality can be supported. Additionally, while the above description focuses on applying the above principles to the generation of customized whitelists, similar principles can be applied to generating other such listings used in security tasks, including tailored blacklists. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

Networks, including core and access networks, including wireless access networks, can include one or more network elements. "Network elements" can encompass various types of routers, switches, gateways, bridges, loadbalancers, firewalls, servers, inline service nodes, proxies, processors, modules, or any other suitable device, component, element, or object operable to exchange information in a network environment. A network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine accessible storage medium having instructions stored thereon, the instructions when executed on a machine, cause the machine to:
receive, at an endpoint device, information to indicate one or more wireless access points for one or more wireless networks at a location;
send, to a remote security server, information to identify at least a particular one of the one or more wireless access points;
receive a request from the remote security server for the endpoint device to participate in a risk assessment of the particular wireless access point;
attempt to communicate with a trusted endpoint over the particular wireless access point to assess the particular wireless access point; and
determine whether data responsive to the attempt to communicate is consistent with data expected from the trusted endpoint; and
report results of the attempt to communicate to the security server.

2. The storage medium of claim 1, wherein the instructions when executed further cause the machine to send a query to the remote security server, wherein the query identifies the particular wireless access point and requests a security report associated with the particular wireless access point.

3. The storage medium of claim 2, wherein the request is received in response to the query.

4. The storage medium of claim 3, wherein the request is sent in response to a determination by the security server that insufficient risk information exists for the particular wireless access point.

5. The storage medium of claim 2, wherein the query queries the security server for risk information for two or more of the detected wireless access points.

6. The storage medium of claim 2, wherein the query includes geo-positional data indicating the location of at least one of the endpoint device and the particular wireless access point.

7. The storage medium of claim 1, wherein the endpoint device comprises a mobile user device.

8. The storage medium of claim 7, wherein the endpoint device comprises one of a tablet and a smartphone.

9. The storage medium of claim 1, wherein the instructions when executed further cause the machine to:
collect information describing attributes of the particular wireless access point; and
send feedback data describing the attributes to the security server.

10. The storage medium of claim 9, wherein the request is received in response to sending the feedback data.

11. The storage medium of claim 9, wherein the feedback data includes at least one of a service set identifier (SSID), data describing encryption used by the particular wireless access point, splash page information, and wireless access point password information.

12. The storage medium of claim 1, wherein attempting to communicate with the trusted endpoint includes attempting to establish a secured connection between the endpoint device and the trusted endpoint, and establishing the secured connection includes receiving expected trust verification data from the trusted endpoint;
wherein receipt of data other than the expected trust verification data in response to the attempt to communicate is presumed to indicate that the particular wireless access point is untrustworthy suggesting higher risk associated with the particular wireless access point.

13. The storage medium of claim 1, wherein a plurality of attempts to communicate trusted endpoints are to be attempted by the endpoint device during a connection with the particular wireless access point to assess the particular wireless access point at a plurality of times during the connection.

14. The storage medium of claim 1, wherein the instructions when executed further cause the machine to receive report data from the security server identifying results of the monitoring of the attempted communication.

15. The storage medium of claim 1, wherein the instructions when executed further cause the machine to receive report data from the security server identifying which of the one or more wireless access points is a trusted wireless access point.

16. The storage medium of claim 15, wherein the report data is based on a previous risk assessment of the one or more wireless access points.

17. The storage medium of claim 16, wherein the endpoint device comprises a particular endpoint device and the previous risk assessment is based on a previous encounter with the particular wireless access point by an endpoint device other than the particular endpoint device.

18. The storage medium of claim 17, wherein the report data is based at least in part on the monitoring of the attempted communication.

19. The storage medium of claim 15, wherein the instructions when executed further cause the machine to present a graphical indicator of risk associated with the particular wireless access point at the endpoint device.

20. The storage medium of claim 1, wherein the particular endpoint is to communicate with the security server over a secure connection.

21. The storage medium of claim 20, wherein the secure connection is implemented over at least one of a wireless mobile broadband connection or a virtual local area network (VLAN) tunnel.

22. A method comprising:
receiving, at an endpoint device, information to indicate one or more wireless access points for one or more wireless networks at a location;
sending, to a remote security server, information to identify at least a particular one of the one or more wireless access points;
receiving a request from the remote security server for the endpoint device to participate in a risk assessment of the particular wireless access point;
attempting to communicate with a trusted endpoint over the particular wireless access point to assess the particular wireless access point;
determining whether data responsive to the attempt to communicate is consistent with data expected from the trusted endpoint; and
reporting results of the attempt to communicate to the security server.

23. A system comprising:
at least one processor device;
at least one memory element; and an endpoint device comprising a security tool comprising logic to:
- receive, at an endpoint device, information to indicate one or more wireless access points for one or more wireless networks at a location;
- send, to a remote security server, information to identify at least a particular one of the one or more wireless access points;
- receive a request from the remote security server for the endpoint device to participate in a risk assessment of the particular wireless access point;
- attempt to communicate with a trusted endpoint over the particular wireless access point to assess the particular wireless access point;
- determine whether data responsive to the attempt to communicate is consistent with data expected from the trusted endpoint; and
- report results of the attempt to communicate to the security server.

24. The system of claim 23, further comprising the security server.

25. The system of claim 23, wherein the endpoint device comprises a mobile user device.

* * * * *